Patented Sept. 6, 1932

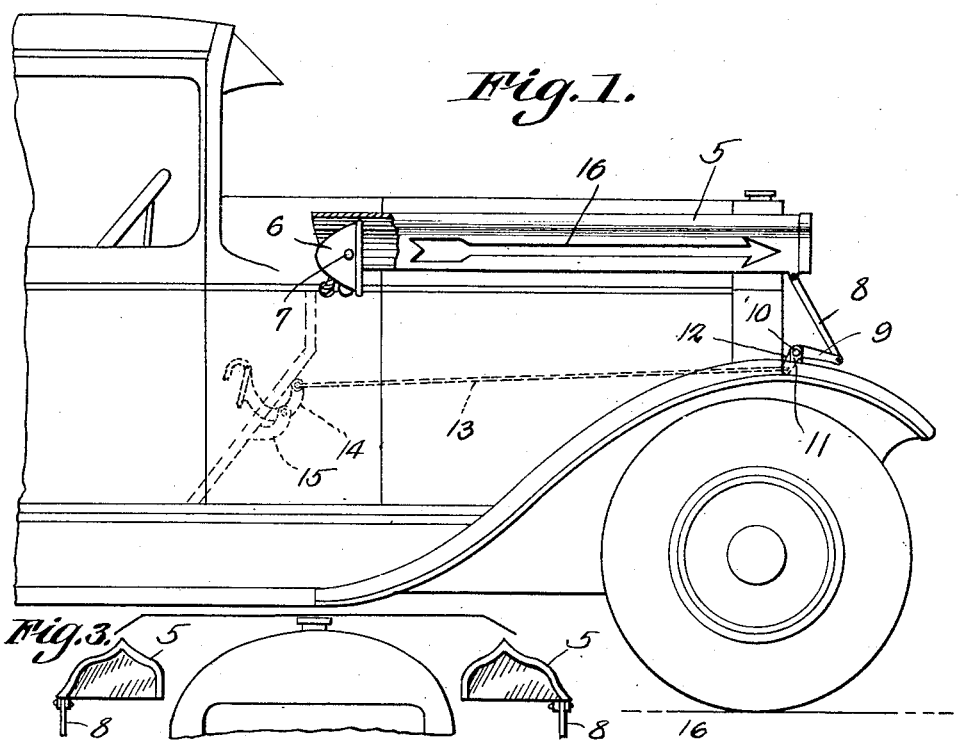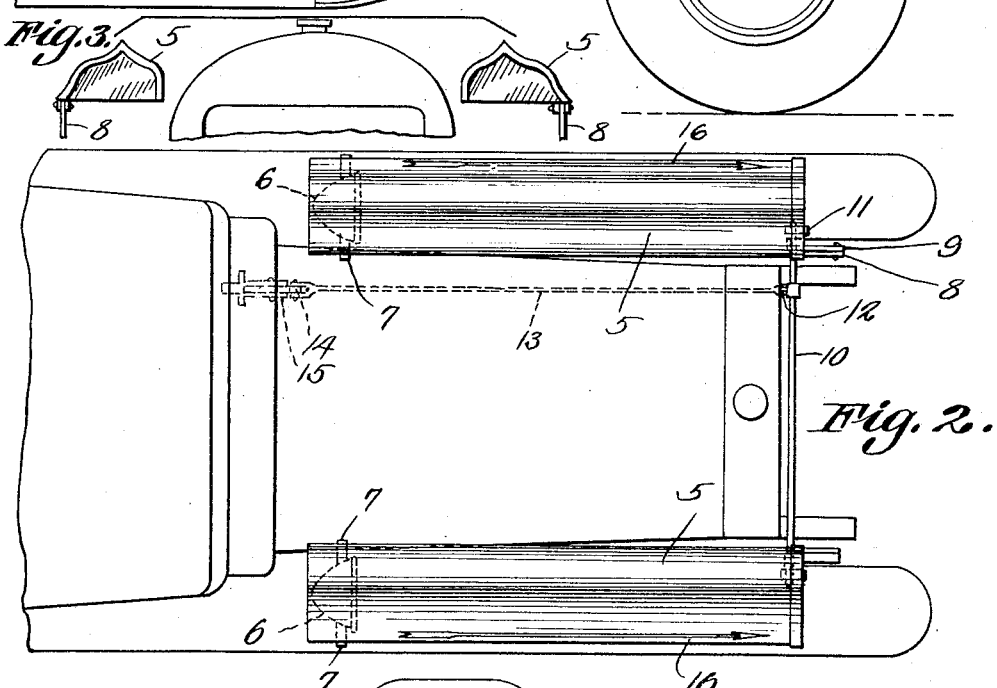

1,875,573

UNITED STATES PATENT OFFICE

FRANK R. DUDLEY, OF FITCHBURG, MASSACHUSETTS

AUTOMOBILE HEADLIGHT

Application filed January 21, 1931. Serial No. 510,257.

This invention relates to motor vehicle headlights, the primary object of the invention being to provide a headlight which will illuminate the road surface directly in front of the vehicle, in such a way as to eliminate glare, and at the same time render night driving safe.

An important object of the invention is to provide headlights which will not be dimmed by the collection of rain, snow, or ice on the lenses thereof.

A further object of the invention is the provision of manually controlled means for raising and lowering the front ends of the headlight casings, to control the light rays projected from the headlights, to the end that the light rays may be projected an appreciable distance beyond the front of the vehicle, when a clear roadway is ahead.

A still further object of the invention is to provide headlights of a novel design, so that persons approaching the vehicle may determine at a glance which headlight is used, should one of the headlights burn out.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is a side elevational view illustrating headlights constructed in accordance with the invention, as positioned on a motor vehicle.

Figure 2 is a plan view thereof.

Figure 3 is a fragmental front elevational view.

Figure 4 is an elevational view of the end of a headlight casing, designed for use on a truck.

Figure 5 is an end elevational view of a casing, indicating the shape of the casing designed for use on a bus.

Referring to the drawing in detail, the reference character 5 designates headlight housings arranged at opposite sides of the hood of the vehicle, and since these housings are identical in construction, only one of the housings will be described in detail.

As clearly shown by the drawing, each housing is of an elongated construction, and extends from a point near the cowl of the vehicle, to a point adjacent to the radiator. These housings are curved transversely throughout their entire lengths, the lower edges thereof extending downwardly to points below a line drawn horizontally through the center of the cowl lights 6, with which the housings are used, so that the light rays projected from the cowl lights, will be directed downwardly below the line of vision of operators of vehicles approaching the vehicle, equipped with the headlights forming the subject matter of the invention.

The inner ends of the housings are formed with bearing openings to receive the laterally extended pins 7, to pivotally support the housings at their inner ends. Connected with the outer ends of the housings are links 8 that have pivotal connection with the arms 9, mounted on the rod 10 in such a way that movement of the rod will result in a relative movement of the links 8 and arms 9, to raise or lower the outer or forward ends of the housings 5. The rod 10 is shown as having its ends mounted in ears 11 that are secured to the front fenders of the vehicle, the rod 10 being provided with a depending arm 12, to which one end of the operating rod 13 is connected, the opposite end of the rod 13 being pivotally connected with the pedal 14, which in turn is mounted on the bracket 15, directly under the floor board.

Thus it will be seen that due to this construction, the operator may by pressing the pedal 14, force the rod 13 forwardly, with the result that the rod 10 will be rotated to raise the arms 8 and 9, and lamp housings connected therewith. When pressure on the pedal 14 is relieved, the housings 5 will return to their normal positions, or positions as shown by Figures 1 and 2 of the drawing. When the housings are elevated, the light rays from the lights 6 will be projected directly forward to illuminate the road surface an appreciable distance beyond the front end of the vehicle. The forward ends of the housings are closed by suitable lenses which may be of any desired translucent material.

As clearly shown by the drawing, cut out portions 16 are formed in the outer sides of the housings, the cut out portions defining indicating arrows, through which light rays will be projected laterally of the housings, illuminating the sides of the vehicle at the front thereof.

It might be further stated that it is contemplated to construct the head lights in a manner as shown by Figure 3 of the drawing, for use on pleasure vehicles, the housings being formed with longer outer sides and central longitudinal ribs.

It is desired to construct the housings in a manner as shown by Figure 4 and indicated at A, when the headlights are to be used on a truck, and when the headlights are to be used on a bus, the headlights are to be constructed as shown by Figure 5 and indicated at B.

When the public has been taught to distinguish between the shapes of the headlights shown on various types of vehicles, the operators of vehicles may determine whether the car approaching, is a pleasure car, truck, or bus, and which headlight is used, should one of the headlights be rendered inoperative.

I claim:

In combination with the cowl lights of a motor vehicle, pins extending laterally from the cowl light housings, elongated lamp housings having their lower sides open, said lamp housings having openings to receive the pins to pivotally support the lamp housings at one of their respective ends, lenses closing the forward ends of the lamp housings, a supporting rod extending across the front of the motor vehicle and connected to the rod, links pivotally connected with the arms and having pivotal connection with the forward ends of the lamp housings, and an operating rod connected to the first mentioned rod to operate the supporting rod to raise and lower the front end of the lamp housing.

In testimony that I claim the foregoing as my own, I have hereto affixed my signature.

FRANK R. DUDLEY.